United States Patent
Hashimoto (10) Patent No.: US 7,792,483 B2
(45) Date of Patent: Sep. 7, 2010

(54) DATA TRANSMITTING APPARATUS, DATA TRANSMITTING METHOD, AND PROGRAM THEREOF

(75) Inventor: Kiyoshi Hashimoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 596 days.

(21) Appl. No.: 11/895,188

(22) Filed: Aug. 23, 2007

(65) Prior Publication Data

US 2008/0051034 A1    Feb. 28, 2008

(30) Foreign Application Priority Data

Aug. 23, 2006    (JP)    ............... 2006-226814

(51) Int. Cl.
*H04Q 7/20*    (2006.01)
(52) U.S. Cl. .................. 455/3.03; 455/3.04; 455/403; 455/419; 455/420; 455/466; 358/1.1; 358/1.15; 358/1.13
(58) Field of Classification Search ............... 455/3.03, 455/403, 419–420, 466, 41.1, 41.2, 41.3, 455/550.1, 500, 517, 575.1, 422.1, 90.3; 358/1.1, 1.15, 1.13
See application file for complete search history.

(56) References Cited

U.S. PATENT DOCUMENTS

| 6,147,765 A | 11/2000 | Yoneda |
| 2003/0050963 A1* | 3/2003 | Lamming et al. ........... 709/203 |
| 2003/0135797 A1 | 7/2003 | Choi |
| 2005/0030375 A1 | 2/2005 | Zangrande et al. |
| 2006/0285155 A1* | 12/2006 | Yamada et al. ............. 358/1.15 |
| 2007/0013939 A1* | 1/2007 | Yoshikawa ................. 358/1.14 |

FOREIGN PATENT DOCUMENTS

| JP | 10-336773 | 12/1998 |
| JP | 11-95941 | 4/1999 |
| JP | 2002-229761 | 8/2002 |
| JP | 2005-510136 | 4/2005 |
| JP | 2005-515704 | 5/2005 |

OTHER PUBLICATIONS

ITX E-Globaledge Corporation and 3 other companies, "Press Release Document," [Online] Aug. 26, 2005, NTT DoCoMo, [search Jul. 17, 2006], "High Speed Infrared Data Communication Method "IrSimple" to the International Standard Standards Adoption."

* cited by examiner

*Primary Examiner*—Keith T Ferguson
(74) *Attorney, Agent, or Firm*—Nutter McClennen & Fish LLP; John J. Penny, V (57) ABSTRACT

A data transmitting apparatus for transmitting data to a communication recipient by one-way communication includes a data transmitting unit transmitting data to the communication recipient by the one-way communication of a predetermined communication format; a data selecting unit allowing a user to select the data to be transmitted by the one-way communication; an instruction inputting unit allowing the user to input an instruction to transmit the data selected by the data selecting unit to the communication recipient by the one-way communication; a control unit controlling the data transmitting unit to transmit the data selected by the data selecting unit to the communication recipient by the one-way communication on the basis of the instruction input through the instruction inputting unit.

8 Claims, 7 Drawing Sheets

DATA TRANSMITTING APPARATUS, DATA TRANSMITTING METHOD, AND PROGRAM THEREOF

The entire disclosure of Japanese Patent Application No. 2006-226814, filed Aug. 23, 2006 is expressly incorporated by reference herein.

BACKGROUND

1. Technical Field

The present invention relates to a data transmitting apparatus, a data transmitting method, and a program thereof.

2. Related Art

Infrared data communication systems in compliance with the Infrared Data Association (IrDA) specification have been used in various information apparatuses such as PDAs, PCs, cellular phones, or portable printers. In August 2005, an IrSimple protocol was formally adopted as a global standard to achieve high-speed communication in transmitting a large amount of contents (see ITX E-Globaledge Corporation and 3 other companies, "Press Release Document", [Online] Aug. 26, 2005, NTT DoCoMo, [search Jul. 17, 2006], Internet <URL:http://www.nttdocomo.co.jp/info/news_release/page/20050 826.html>). The IrSimple protocol is expected to be adopted for other new usages in addition to known usages. In addition, one-way communication as well as two-way communication is disclosed in the IrSimple Protocol. Suppose that a data transmitting apparatus such as a cellular phone or a digital still camera transmits image data to a data receiving apparatus such as a printer. At this time, the one-way communication enables the image data to be transmitted at a high speed.

When the one-way communication of the IrSimple Protocol enables data to be transmitted from the data transmitting apparatus to the data receiving apparatus, the data can be transmitted from the data transmitting apparatus. However, unless the data is transmitted under the transmission condition that the data receiving apparatus can receive the data, the data receiving apparatus cannot receive the data. In this case, when users know that the data receiving apparatus does not respond (for example, an operation of a printer when the data receiving apparatus is the printer), the users enable the data transmitting apparatus to transmit the same data to the data receiving apparatus several times. However, since the transmission condition of the data transmitting apparatus is different from that of the data receiving apparatus, the data cannot be transmitted in spite of the repeated transmission of the data. Moreover, the data transmitting apparatus cannot inform users that a transmission error may occur.

SUMMARY

An advantage of some aspects of the invention is that it provides a data transmitting apparatus, a data transmitting method, and a program thereof that enable the next same data to be successfully transmitted when a data transmission error can occur in one-way communication in view of the above-described circumstances. Moreover, another advantage of some aspect of the invention is that it provides the data transmitting apparatus, the data transmitting method, and the program thereof that allow users to know the fact that there is the possibility that the data transmission error occur in the one-way communication.

In order to achieve some above-described advantages, the following aspects are adopted in the data transmitting apparatus, the data transmitting method, and the program according to the invention.

According to an aspect of the invention, there is provided a data transmitting apparatus for transmitting data to a communication recipient by one-way communication, the data transmitting apparatus including: a data transmitting unit transmitting data to the communication recipient by the one-way communication of a predetermined communication format; a data selecting unit allowing a user to select the data to be transmitted by the one-way communication; an instruction inputting unit allowing the user to input an instruction to transmit the data selected by the data selecting unit to the communication recipient by the one-way communication; a control unit controlling the data transmitting unit to transmit the data selected by the data selecting unit to the communication recipient by the one-way communication on the basis of the instruction input through the instruction inputting unit; and a detecting unit detecting successive inputs that the instruction to transmit the same data to the communication recipient by the one-way communication is successively input by the instruction inputting unit, when the data selecting unit selects the same data, wherein the control unit controls the data transmitting unit to change the communication format of the one-way communication when the detecting unit detects the successive inputs.

That is, when the same data is intended to be transmitted successively by the one-way communication, there is a possibility that the transmission by the one-way communication fails, and if the transmission fails, the communication format of the data may be a cause. Accordingly, after the communication format of the data is changed, the same data is transmitted. In this way, when the same data is transmitted, the data can be transmitted successfully by changing the communication format of the data.

In the data transmitting apparatus with the above-described configuration, the detecting unit may detect the successive inputs that the instruction to transmit the same data to the communication recipient by the one-way communication is successively input by the instruction inputting unit within a predetermined time, when the data selecting unit selects the same data. Alternatively, the detecting unit may detect the successive inputs that the instruction to transmit the same data to the communication recipient by the one-way communication is successively input by the instruction inputting unit a predetermined number of times, when the data selecting unit selects the same data. When the data is successively input at a predetermined time or a predetermined number of times, there is a high possibility that the transmission carried out by the one-way communication fails. Accordingly, by changing the communication format of the data and transmitting the same data, the next same data can be transmitted successfully. In this case, as the predetermined time, a value experientially acquired by the user in the manner of repeating the transmission operation when the data transmission fails may be set. In addition, as the predetermined number of times, a value experientially acquired by the user in the manner of repeating the transmission of the same data may be set.

The data transmitting apparatus with the above-described configuration may further include a change/non-change inputting unit allowing the user to input an instruction to change or not change the communication format; and an asking unit asking the user to input the instruction, wherein the control unit controls the asking unit to ask the user to input the instruction to change or not change the communication format when the detecting unit detects the successive inputs, wherein the control unit controls the data transmitting unit to change the communication format when the instruction to change the communication format is input through the change/non-change inputting unit, and wherein the control unit controls the transmitting unit not to change the communication format when the instruction not to change the communication format is input through the change/non-change inputting unit. In this way, an intention of the user can be reflected.

In the data transmitting apparatus with the above-described configuration, the communication format changed by the control unit may be at least one of a transmission interval of a frame, a data size of the frame, a baud rate of the frame, and a communication rate of the frame when the data is transmitted in a plurality of frames. Since the transmission interval of the frame, the data size of the frame, the baud rate of the frame, the communication rate of the frame are different from those of the communication recipient, there is a high possibility that the data transmission fails. As a result, the application of the invention is significant.

The data transmitting apparatus with the above-described configuration may further include a data receiving unit receiving data from the communication recipient, wherein the control unit controls the data transmitting unit and the data receiving unit to change the one-way communication to two-way communication that enables the data transmitting unit and the data receiving unit to communicate with each other when the detecting unit detects the successive inputs. In this way, information about the communication format that the communication recipient is permissible can be obtained. As a result, when the same data is transmitted in the next time, the data can be transmitted successfully.

According to another aspect of the invention, there is provided a data transmitting apparatus for transmitting data to a communication recipient by one-way communication, the data transmitting apparatus including: a data transmitting unit transmitting data to the communication recipient by the one-way communication; a data selecting unit allowing a user to select the data to be transmitted by the one-way communication; an instruction inputting unit allowing the user to input an instruction to transmit the data selected by the data electing unit to the communication recipient by the one-way communication; a control unit controlling the data transmitting unit to transmit the data selected by the data selecting unit to the communication recipient by the one-way communication on the basis of the instruction input through the instruction inputting unit; a detecting unit detecting successive inputs that the instruction to transmit the same data to the communication recipient by the one-way communication is successively input by the instruction inputting unit, when the data selecting unit selects the same data; and a notification unit notifying information to the user, wherein the notification unit notifies a possibility of a transmission error to the user when the detecting unit detects the successive inputs.

In this way, when there is a possibility that the data transmission fails in the one-way communication, the user can know the transmission error. For example, the user can change the transmission conditions and transmit the data again when knowing the possibility that the data transmission fails.

The data transmitting apparatus may be a unit that determines whether the instruction inputting unit successively inputs the instruction to transmit the data to the communication recipient by the one-way communication on the basis of identification information of the data that the data transmitting unit transmits when the data selecting unit selects the same data.

According to still another aspect of the invention, there is provided a method of transmitting data to a communication recipient by one-way communication, the method including: (a) transmitting the data to the communication recipient by the one-way communication on the basis of an instruction to transmit the data selected as data to be transmitted by the one-way communication by a user to the communication recipient by the one-way communication; and (b) changing a communication format of the data when the same data is selected as the data to be transmitted by the one-way communication and the instruction to transmit the data to the communication recipient by the one-way communication is successively input.

In the method of transmitting the data, the data is transmitted to the communication recipient on the basis of the instruction to transmit the data selected as the data to be transmitted by the one-way communication by the user to the communication recipient by the one-way communication, and the communication format is changed when the instruction to transmit the data to the communication recipient by the one-way communication is successively input when the same data is selected as the data to be transmitted by the one-way communication. That is, when the same data is intended to be transmitted successively by the one-way communication, there is a possibility that the transmission by the one-way communication fails, and if the transmission fails, the communication format of the data may be a cause. Accordingly, after the communication format of the data is changed, the same data is transmitted. In this way, when the same data is transmitted, the data can be transmitted successfully by changing the communication format of the data. Moreover, steps of realizing operations or functions by means of various configurations constituting the above-described data transmitting apparatus according to the invention may be added.

According to still another aspect of the invention, there is provided a method of transmitting data to a communication recipient by one-way communication, the method including: (a) transmitting the data to the communication recipient by the one-way communication on the basis of an instruction to transmit the data selected as data to be transmitted by the one-way communication by a user to the communication recipient by the one-way communication; and (b) notifying a possibility that the transmission error occurs to the user when the same data is selected as the data to be transmitted by the one-way communication and the instruction to transmit the data to the communication recipient by the one-way communication is successively input.

In the method of transmitting the data, the data is transmitted to the communication recipient on the basis of the instruction to transmit the data selected as the data to be transmitted by the one-way communication by the user to the communication recipient by the one-way communication, and a possibility that the transmission error occurs is notified to the user when the instruction to transmit the data to the communication recipient by the one-way communication is successively input when the same data is selected as the data to be transmitted by the one-way communication. In this way, when there is the possibility that the data transmission fails in the one-way communication, the user can know the transmission error. Moreover, steps of realizing operations or functions by means of various configurations constituting the above-described data transmitting apparatus according to the invention may be added.

The program according to the invention is provided to perform each of the steps of the data transmitting method described above in one or a plurality of computers. The program may be memorized in recording media (for example, a hard disc, ROM, FD, DC, DVD, etc) which a computer can read, may be transmitted from a computer to another computer through transmission media (Internet or communication networks such as LAN), and may be received or transmitted in any forms. When the program is executed in one computer or a plurality of computers, each of the steps of the above-described data transmitting method is executed. Accordingly, it is possible to obtain an operation effect as the same as that of the above-described data transmitting method.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
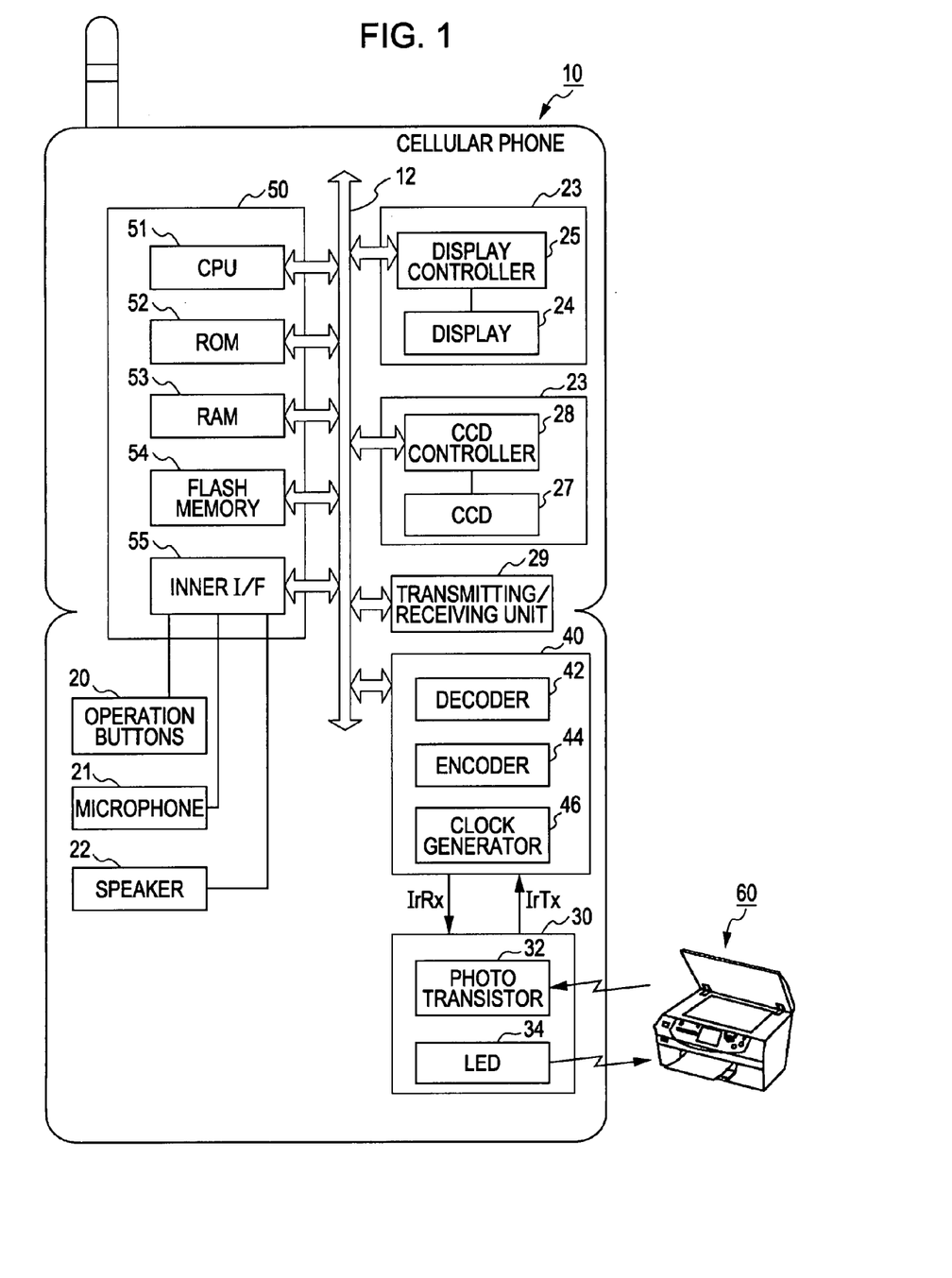
FIG. 1 is a block diagram illustrating an overall configuration of a cellular phone.
Figure 2:
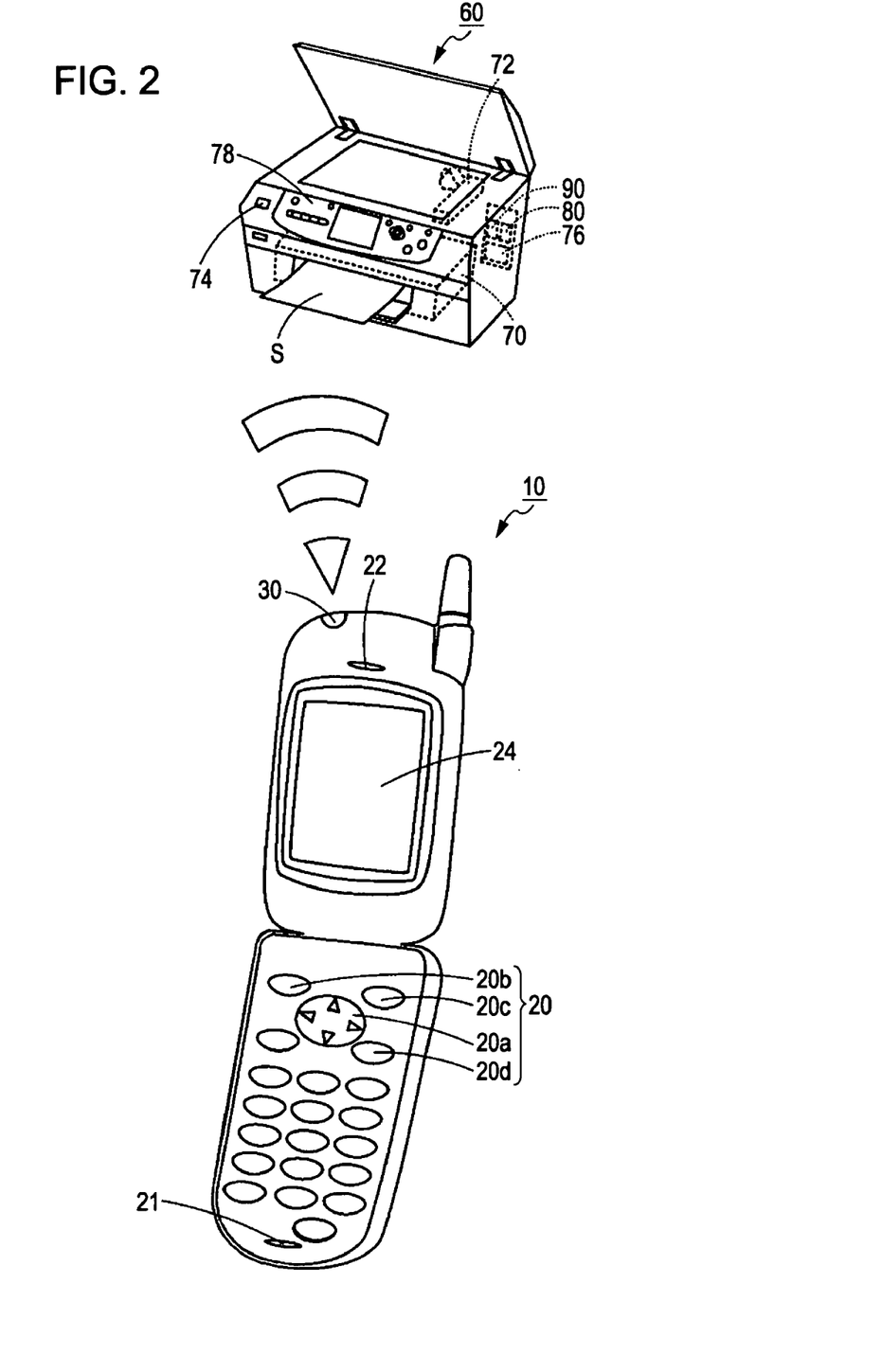
FIG. 2 is a diagram illustrating appearances of the cellular phone and a multifunction printer.

An embodiment of the invention will be described with reference to the drawings. FIG. 1 is a block diagram illustrating an overall configuration of a cellular phone 10, which is an example of a data transmitting apparatus according to the embodiment of the invention. FIG. 2 is a diagram illustrating appearances of the cellular phone 10 and a multifunction printer 60.

As shown in FIG. 1, the cellular phone 10 according to the embodiment includes operation buttons 20 that have a cursor key, etc., a microphone 21 that collects voice spoken at an ear piece, a speaker 22 that outputs the voice to the outside through a mouth piece, a display unit 23 that displays various screens (images), a CCD unit 26 that takes an picture, a transmitting/receiving unit 29 that is an data inputting/outputting interface of a cellular phone network, an infrared communication port 30 that receives and emits infrared rays, an IrDA controller 40 that transmits and receives data with an outside infrared communication apparatus (for example, the multifunction printer 60) by controlling the infrared communication port 30, and a main controller 50 that generally controls a cellular phone.

The cellular phone 10 is configured so that the display unit 23, the CCD unit 26, the transmitting/receiving unit 29, the IrDA controller 40, and the main controller 50 exchange various control signals or data with each other through a bus 12.

As shown in FIG. 2, the operation buttons 20 are constituted by a cursor key 20a used to select menu items, an image file for transmission, etc., selection buttons 20b for carrying out functions of displaying or selecting a transmission image selecting menu, a cancel button 20c for carrying out a function of canceling the selection, a transmission start button 20d for carrying out a function of starting one-way transmission of the IrSimple protocol.

As shown in FIG. 1, the display unit 23 includes a display 24 and a display controller 25. The display 24, which is a liquid crystal display, displays the transmission image selecting menu for selecting an image to be transmitted, a transmission status, etc. The display controller 25, which is a circuit for controlling the display 24, has a function of driving the display 24 to display various menus, etc. by instructions of the main controller 50.

The CCD unit 26 includes a CCD 27 and a CCD controller 28. The CCD 27 is constituted by a known CCD image pickup device with a photoelectric conversion element that coverts light incident through a lens (not shown) into electric charges and accumulates them, a charge transfer element that transmits the accumulated electric charges, and the like. The CCD controller 28, which is a circuit for driving the CCD 27, has a function of memorizing the data picked up by the CCD 27 according to an instruction of the main controller 50 in a readable memory.

The infrared communication port 30 is disposed in the vicinity of the surface of the cellular phone 10 so that a photo transistor 32 collects infrared rays which the multifunction printer 60 emits and an LED 34 emits the infrared rays toward the multifunction printer 60 (see FIG. 2). The infrared communication port 30 is configured to be capable of performing communication based on a communication type of an IrDA protocol and the IrSimple protocol. This communication type of the IrDA protocol provides two-way communication. For example, when an image of 500 kbyte is transmitted from the cellular phone 10 to the multifunction printer 60 by means of an IrDA-4 M type, it takes about 3 seconds to execute an apparatus detection sequence (in the range of 500 msec to 1 sec) or an apparatus connection sequence (in the range of 300 to 500 msec) at 9600 bps and then to transmit data while performing the two-way communication at 4 Mbps. Alternatively, the IrSimple protocol provides two types of the one-way communication and the two-way communication. For example, when the image of 500 kbyte is transmitted from the cellular phone 10 to the multifunction printer 60 by means of an IrDA-4 M type, it generally takes less than about 1 second to execute the apparatus connection sequence at 9600 bps and then to transmit data at 4 Mbps. In addition, in the two-way communication, both the photo transistor 32 and the LED 34 are used, but in the one-way communication, only the LED 34 is used and the photo transistor 32 is not used.

The IrDA controller 40 includes a decoder 42 that converts a voltage signal IrRx, which is output from the infrared communication port 30 after the photo transistor 32 of the infrared communication port 30 collects infrared rays, into binary data streams (zero and one values), an encoder 44 that generates a voltage signal IrTx, which is output to the infrared communication port 30, from the binary data streams in order to drive the LED 34 of the infrared communication signal IrTx, and a clock generator 46 that generates a clock for controlling a conversion timing of each voltage signal IrRx and IrTx and the binary data streams. In addition, the clock generator 46 can generate other clocks in accordance with a plurality of other rates (9600 bps, 115.2 kbps, and 4 Mbps in the embodiment).

Figure 3:
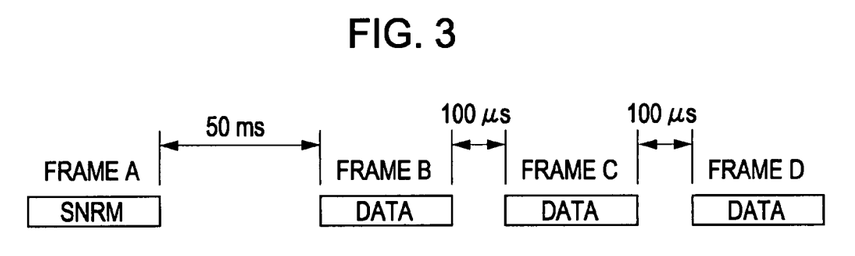
FIG. 3 is an explanatory diagram illustrating frames used to transmit data by one-way communication.

The one-way communication of the IrSimple protocol will be described with reference to FIG. 3. FIG. 3 is an explanatory diagram illustrating frames used to transmit data by the one-way communication. As the frames used to transmit data, there are a frame A including a set normal response mode (SNRM) command used as a connection signal, frames B, C, and D including image data, a cutting frame used as a cutting signal (not shown). When the data is transmitted, first, the frame A is transmitted at 9600 bps. Subsequently, the frame B is transmitted at 4 Mbps after 50 msec, and then the frames C and D are transmitted at 4 Mbps at 100 µsec interval.

As shown in FIG. 1, the main controller 50, which are constituted by microprocessors such as a CPU 51, and the like, includes an ROM 52 that memorizes various processing programs, various data, various tables, etc., an RAM 53 that temporarily memorizes image files, text files, etc. or stores data, a flash memory 54 that can electrically perform a rewriting function and keeps data during a period of turning off a power supply, an inner interface 55 that inputs operation signals of the operation buttons 20 and exchanges voice signals with the microphone 21 or the speaker 22. In addition, these constituents are connected to each other to exchange each signal through a bus 12. In this case, the flash memory 54 stores telephone-book data that is made sequentially by user operations of the operation buttons 20, transmission mail data that is transmitted or scheduled to be transmitted to other cellular phones, personal computers, or the like through the transmitting/receiving unit 29, reception mail data that is received form other cellular phones, personal computers, and the like through the transmitting/receiving unit 29, memo-pad data that is made by the operation of the operation buttons 20, and image files that are made in the manner that the CCD unit 26 takes a picture, etc. The main controller 50 inputs various operation signals or various detection signals of the CCD unit 26, the transmitting/receiving unit 29, an the IrDA controller 40 or inputs operation signals generated in accordance with the operations of the operation buttons 20 or voice input signals of the microphone 21 through the inner interface 55. In addition, based on the operation signals input from the operation buttons 20 through the inner interface 55, the main controller 50 outputs instructions to the transmitting/receiving unit 29 to access a cellular phone network, outputs instructions to the display unit 23 so display information about the transmission image selecting menu for selecting the image files to be transmitted or transmission status, or the like, outputs instructions to the IrDA controller 40 to transmit data through the infrared communication port 30, outputs voice input signals input from the microphone 21 through the inner interface 55 to the transmitting/receiving unit 29 as data signals output to the cellular phone network, outputs data transmitted to a destination by means of an infrared communication to the IrDA controller 40, or outputs a driving signal of the speaker 22 through the inner interface 55.

Figure 4:
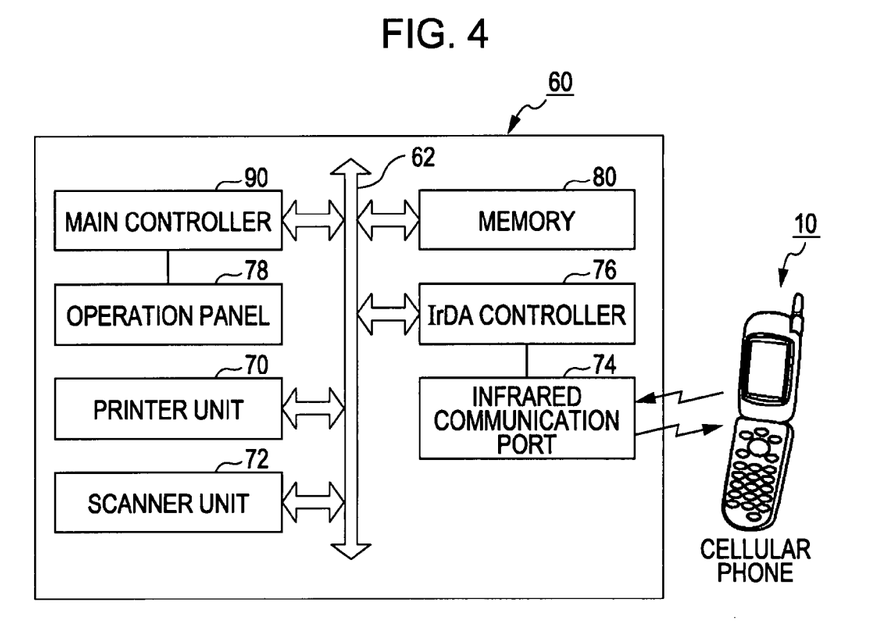
FIG. 4 is a block diagram illustrating an overall configuration of the multifunction printer.

As shown in FIGS. 2 and 4, the multifunction printer 60, which has an infrared communication function on the basis of the IrDA protocol or the IrSimple protocol, includes a printer unit 70 that carries out printing on print paper S, a scanner unit 72 that scans a document put on a glass support, an infrared communication port 74 that receives and emits infrared rays, an IrDA controller 76 that transmits and receives, or just receives data from the cellular phone 10, which is the infrared communication apparatus, by controlling the infrared communication port 74, an operation panel 78 that displays various types of information or inputs user instructions, a memory 80 that can temporarily store various data, and a main controller 90 that generally controls the multifunction printer 60. The printer unit 70 includes a printer engine (not shown) that is configured as a color printer device of a known ink jet type for carrying out printing by ejecting ink on paper from a print head. Configurations of the infrared communication port 74 and the IrDA controller 76 are same as those of the infrared communication port 30 and the IrDA controller 40 of the cellular phone 10. The main controller 90 carries out various controls. One of these controls is that when an image file transmitted from the cellular phone 10 toward the multifunction printer 60 is damaged by the one-way communication on the basis of the IrSimple protocol, the main controller 90 outputs an instruction to the printer unit 70 so as to print the image file received by the infrared communication port 74 and the IrDA controller 76 on the paper S.

Figure 5:
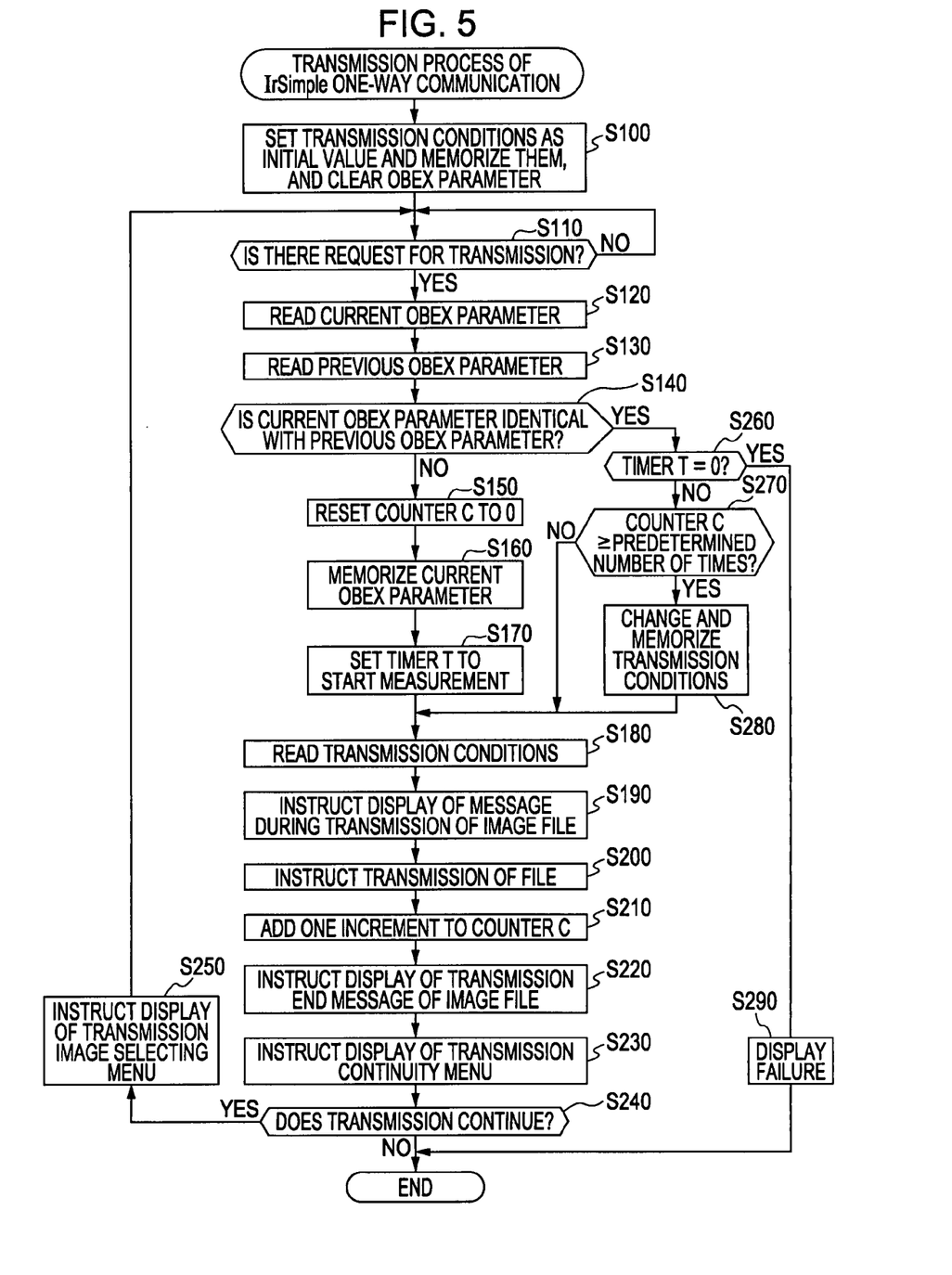
FIG. 5 is a flow chart illustrating an example of a processing routine of transmitting data by the one-way communication.
Figure 6A:
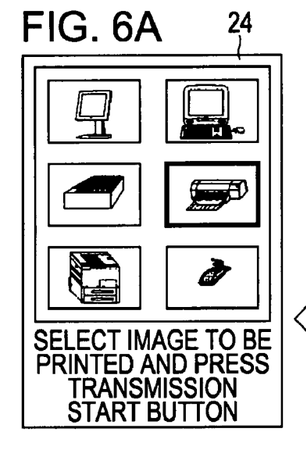
FIGS. 6A, 6B, 6C, 6D, and 6E are diagrams illustrating screens displayed in a display of the cellular phone.
Figure 6B:
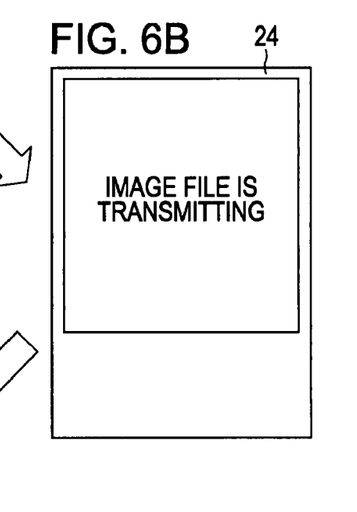
Figure 6C:
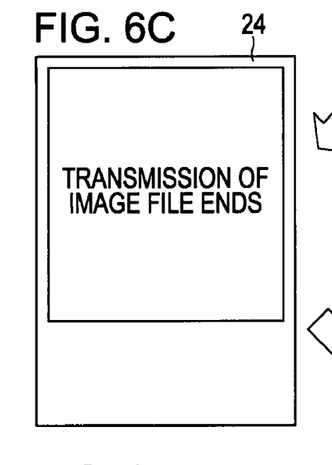
Figure 6D:
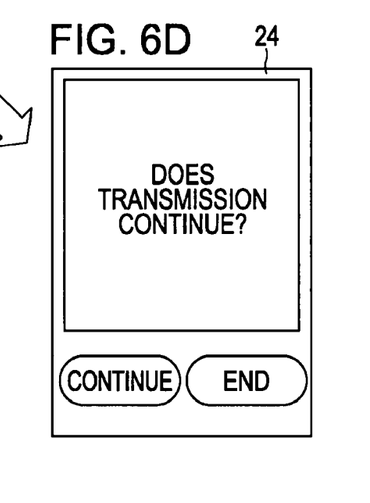
Figure 6E:
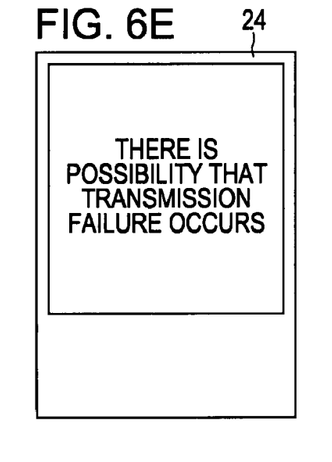

Next, operations of the cellular phone 10 configured in the way described above will be described. In particular, the operations in a case the image files are transmitted from the cellular phone 10 to the multifunction printer 60 by the one-way communication on the basis of the IrSimple protocol will be described. FIG. 5 is a flow chart illustrating an example of a transmission processing routine of the IrSimple one-way communication carried out by the CPU 51 in the main controller 50 of the cellular phone 10. FIGS. 6A, 6B, 6C, 6D, and 6E are diagrams illustrating screens displayed in a display 24 of the cellular phone 10 in relation with the routine. The routine is memorized in the ROM 52 of the cellular phone 10. In addition, when a user transmits the image file to the multifunction printer 60, the user presses a selection button 20b of the operation/buttons 20 of the cellular phone 10. At this time, the routine is executed when the transmission image selecting menu (see FIG. 6A) for selecting images displayed as thumbnails to be transmitted is displayed. When the transmission processing routine of the IrSimple one-way communication shown in FIG. 5 is executed, the CPU 51 of the main controller 50 of the cellular phone 10 sets transmission conditions as initial values to store them in a memory 53, and then clears OBEX parameters stored in the memory 53 (step S100). Examples of the transmission conditions include a minimum packet interval representing a transmission interval of frames concluding the image data, a data size representing a size of one frame, a communication rate representing an amount of data to be transmitted per a unit time, etc. In the embodiment, as the initial values, the minimum packet interval of 100 µs, the data size of 2048 byte, the communication rate of 4 Mbps are set. In addition, examples of the OBEX parameters include a file name, a data size of the image file, and a created data and time.

Next, after a user selects the image file to be printed by operating the cursor key 20a and the like of the operation buttons 20, it is determined whether the instruction to transmit the image file is input by a press of the transmission start button 20d of the operation button 20 (step S110). It is waited while the instruction to transmit the selected image file is not input, and alternatively when the instruction to transmit the selected image file is input, the next step S120 proceeds. At step S120, the parameters (the OBEX parameters describe above) as identification information of the image file selected by the user are read in the image file. Subsequently, the previous OBEX parameters memorized in the memory 53 the last time are read (step S130). At this time, the current OBEX parameters read in the image file at step S120 are compared to the previous OBEX parameters read in the memory 53 at step S130 to determine whether they are identical with each other (step S140). The reason to determine whether the OBEX parameters are identical with each other is to determine whether the image file identical with the image file in the last time is selected. In this case, it is determined whether all the above-described parameters (the file name, the data size, and the created data and time) are identical. Moreover, when the routine is started and the parameters are initially compared with each other, the previous OBEX parameters (for example, when the values as the previous parameters are all zero) cleared at step S100 are compared to the OBEX parameters read at step S120. Consequently, a negative acknowledgment determination is made at step S140. When the current OBEX parameters and the previous parameters are not identical with each other, a counter C is reset to a value 0 (step S150). In this case, the counter C represents the successive transmission number of times of the identical image file. Subsequently, the OBEX parameters read at step S120 is overwritten to the previous OBEX parameters (step S160), and then a timer T is set to carry out a measurement (step S170). The timer T represents a remaining time until it is determined that an occurrence of a communication error is possible after an initial image file is transmitted. In this case, a predetermined time (for example, 30 seconds) is set at step S170 to start the measurement of the remaining time. Subsequently, the transmission conditions are read from the memory 53 (step S180). When a process of step S180 starts to be executed, initial values memorized in the memory 53 at step S100 are read. Next, an instruction is output to a display controller 25 so that a message "TRANSMITTING IMAGE FILE" is displayed on the display 24 (step S190, see FIG. 6B). In this way, the frame A (see FIG. 4) including the SNRM command is transmitted at 9600 bps as a connection signal on the basis of the IrSimple protocol, and then the frame B (see FIG. 4) including the image data is transmitted at 4 Mbps. An instruction is output to the IrDA controller 40 so that the cutting frame (not shown) is finally transmitted as the cutting signal (step S200). Next, in order to represent that the transmission of the image file is completed once, one increment is added to the counter C (step S210). In this way, an instruction is output to the display controller 25 so that a message "TRANSMISSION OF IMAGE FILE IS COMPLETED" is displayed on the display 24 (step S220, see FIG. 6C). Subsequently, an instruction is output to the display controller 25 so that a message "DOES TRANSMISSION CONTINUE?" is displayed on the display 24 (step S230, see FIG. 6D). In this way, the user is urged to input the instruction. Next, the user operates the cursor key 20a of the operation buttons 20 so as to determine whether the input instruction is an instruction to continue or not continue the transmission (step S240). When the user inputs an instruction to continue the transmission, the instruction is output to the display controller 25 so that the above-described transmission image selecting menu is displayed (step S250, see FIG. 6A) to proceed step S110. In addition, it is waited again until the transmission instruction of the user is input. Alternatively, when the user inputs an instruction to finish the transmission, the routine ends.

At step S140, when the current OBEX parameters are identical with the previous OBEX parameters, it represents that the same image file is transmitted repeatedly by the instruction of the user. In this case, to begin with, it is determined whether the timer T is zero or not (step S260). When the timer T is not zero, it is determined whether the value of the counter C is a predetermined number of times (2 in the embodiment) or more (step S270). The predetermined number of times denotes the maximum number of times to successively transmit the same image file without a change in the transmission conditions. In this case, since the predetermined number of times is 2, the transmission conditions are not changed until the second transmission instruction of the same image file is input. Moreover, the reason why the image file is transmitted on the same transmission conditions is that the transmission is carried out when the cellular phone 10 and the multifunction printer 60 are not properly faced. Accordingly, the proper transmission of the image file is not carried out, and afterward the cellular phone 10 and the multifunction printer 60 is properly faced to carry out the transmission. When the value of the counter C is less than the predetermined number of times, step S180 proceeds without a change in the transmission conditions. Alternatively, when the value of the counter C is equal to or more than the predetermined number of times, the transmission is changed and the transmission conditions previously memorized are overwritten (step S280) so that step S180 proceeds. The transmission conditions, as described above, include the minimum packet interval, the data size, and the communication rate. For example, the transmission conditions are changed based on a predetermined table as shown in the following Table 1. According to Table 1, when the first transmission condition is changed, the communication rate of 4 Mbps is changed to that of 115.2 kbps. When the second transmission condition is changed, the minimum packet interval of 100 μs is changed to that of 500 μs. When the third transmission condition is changed, the data size of 2048 byte is changed to that of 1024 byte. Subsequently, the processes related to the transmission of the image file from steps S180 to S240 or the process to determine whether the transmission continues is executed. At this time, when an instruction to continue the transmission is input by the user, the instruction is output to the display controller 25 so as to display the above-described transmission image selecting menu (step S250, see FIG. 6A), and then step S110 proceeds. In addition, it is waited again until the transmission instruction is input by the user. Alternatively, when the user inputs an instruction to finish the transmission, the routine ends.

TABLE 1

| | |
|---|---|
| CHANGE IN FIRST TRANSMISSION CONDITION | COMMUNICATION RATE: 4 MBPS → 115.2 KBPS |
| CHANGE IN SECOND TRANSMISSION CONDITION | MINIMUM PACKET INTERVAL: 100 μs → 500 μs |
| CHANGE IN THIRD TRANSMISSION CONDITION | DATA SIZE: 2048 BYTE → 1024 BYTE |
| . | . |
| . | . |
| . | . |

At step S260, when the value of the timer T is zero, the occurrence of the transmission error is possible. Consequently, the instruction is output to the display controller 25 so that a message "OCCURRENCE OF TRANSMISSION ERROR IS POSSIBLE" is displayed on the display 24 (step S290, see FIG. 6E). In addition, the routine ends.

A case where the communication of the multifunction printer 60 is possible in correspondence to the initial values of the transmission conditions of the cellular phone 10 and a case where the communication is not possible will be described. Specifically, a case where the multifunction printer 60 corresponds to the communication rate of 4 Mbps will be described. In addition, a case where the multifunction printer 60 corresponds to not the communication rate of 4 Mbps but the communication rate of 115.2 kbps will be described. The other transmission conditions are identical and correspond to the initial values of the transmission conditions of the cellular phone 10.

Figure 7:
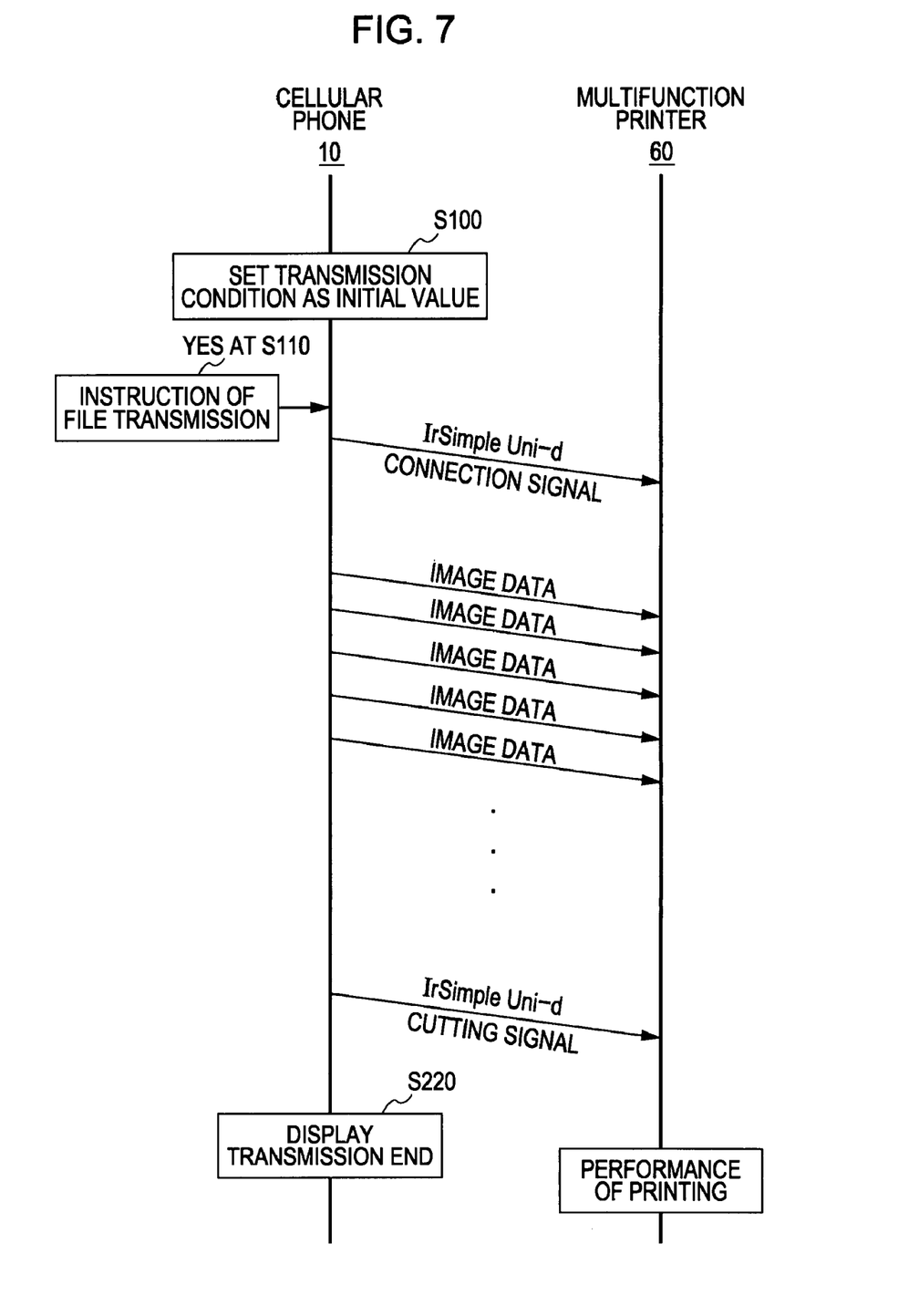
FIG. 7 is a chart illustrating sequences when a printer is in an initial transmission condition.

First, the case where the multifunction printer 60 corresponds to the communication rate of 4 Mbps will be described. In this case, a transmission process of the IrSimple one-way communication of the cellular phone 10 shown in FIG. 5 is executed by the CPU 51 of the main controller 50. At this time, when a user initially inputs a transmission instruction of a file at step S110, the transmission process at step S200 is executed from steps S120 to S140 (the negative acknowledgment determination) and from steps S150 to S190. As long as the cellular phone 10 and the multifunction printer 60 are properly faced with each other, the multifunction printer 60 can receive the frame A (see FIG. 4) including the SNRM command transmitted from the cellular phone 10 at 9600 bps, the frame B and the subsequent frames (see FIG. 4) including the image data transmitted at 4 Mbps, a connection cutting frame (not shown) transmitted at 4 Mbps. Accordingly, after receiving these frames, the multifunction printer 60 prints the image data including the received frames. The user confirms that the image file is printed, and then selects a transmission end at step S240 when there is no additional received image file. Alternatively, when there is an additional image file to be printed, the user selects the transmission continuity at step S240. Afterward, at step S250, the user selects the image file to be printed from the transmission image selecting menu displayed on display 24, and then inputs the transmission instruction at step S110. In this way, while the image file is normally transmitted and the user transmits another image file, the transmission process of the IrSimple one-way communication is executed without the change in the transmission conditions. In addition, FIG. 7 shows a sequence chart that illustrates communication sequences when the transmission instruction of the image file is input by a user, and then a first transmission induces a printing process.

Figure 8:
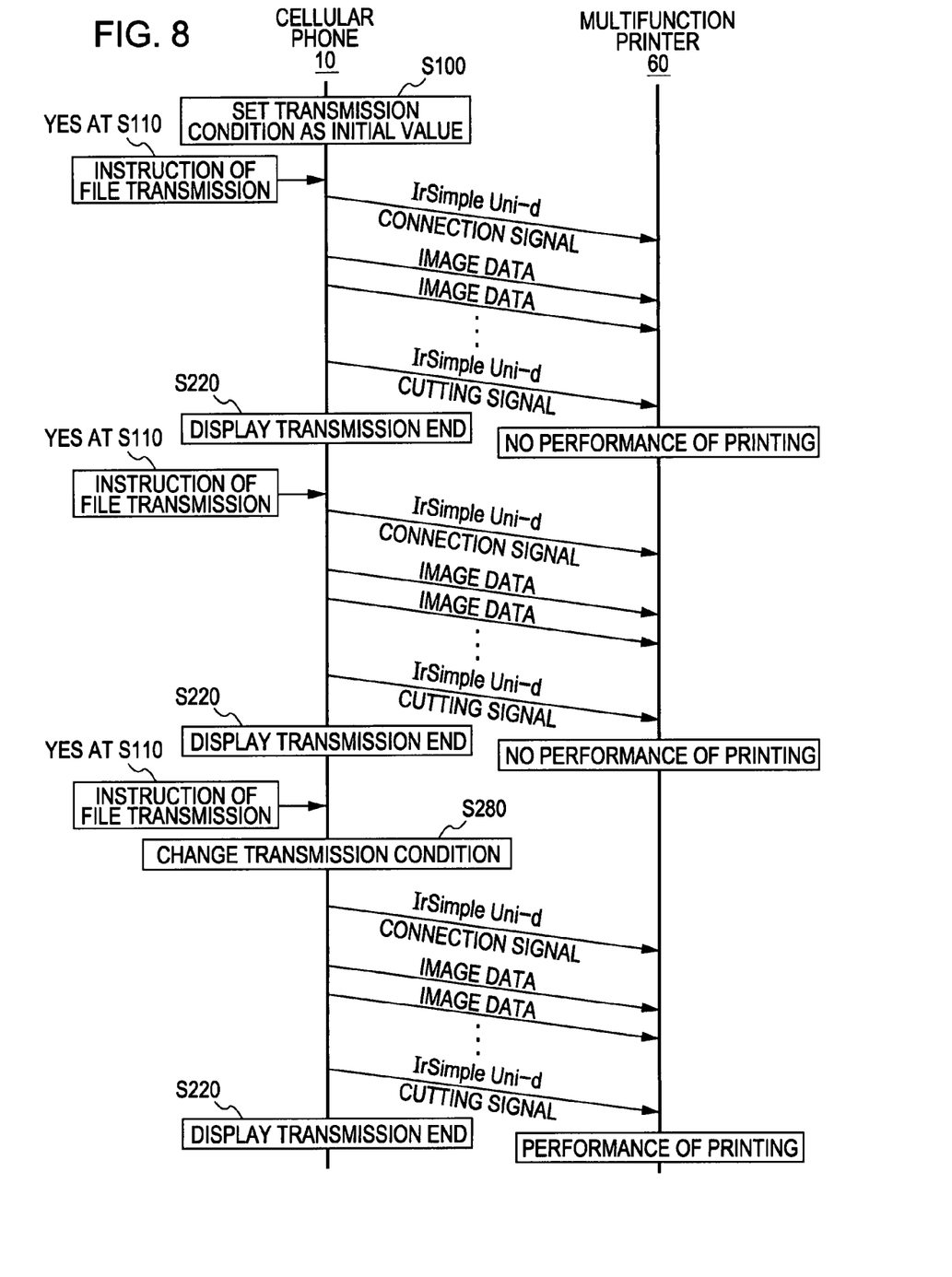
FIG. 8 is a chart illustrating sequences when the printer is not in the initial transmission condition.

Next, the case where the multifunction printer 60 corresponds to not the communication rate of 4 Mbps, but the communication rate of 115.2 kbps will be described. In this case, a transmission process of the IrSimple one-way communication of the cellular phone 10 shown in FIG. 5 is executed by the CPU 51 of the main controller 50. At this time, when a user initially inputs a transmission instruction of a file at step S110, the transmission process at step S200 is executed from steps S120 to S140 (the negative acknowledgment determination) and from steps S150 to S190. In addition, one increment value is added to the counter C, and thus the counter C becomes 1. However, since the cellular phone 10 transmits the frames including the image data at 4 Mbps, the multifunction printer 60 fails to receive the frames, and thus does not perform the printing process. Accordingly, when the user confirms that the printing process is not performed, the user selects the transmission continuity at step S240, and then selects the same image file to carry out the transmission at step S250. Afterward, steps S120 and S130 are executed, and then at step S140, a positive acknowledgment determination is made since the OBEX parameters are identical with the previous OBEX parameters. In addition, when a predetermined time does not lapse from the first transmission, the value of the counter C is determined at step 270. At this moment, the value of the counter C is 1 and the predetermined number of times is 2 in the embodiment. Accordingly, even when the image file is transmitted at the second time, the transmission is carried out under the same transmission conditions. One increment is thus added to the counter C and the value of the counter C becomes 2. However, since no transmission conditions are changed, the multifunction printer 60 does not perform the printing process. Accordingly, the user transmits the same image file the third time. Then, like the second transmission, steps S120 and S130 are executed, and then the positive acknowledgment determination is made at step S140. When the predetermined time does not lapse, the value of the counter C is determined again at step S270. At this moment, since the value of the counter C is 2 and the predetermined number of times is set to 2, the positive acknowledgment determination is made at step S270 and the transmission conditions are changed at step S280 according to Table 1. In this case, the communication rate is changed from 4 Mbps to 115.2 kbps because of corresponding to the change in the first transmission condition. Then, in the third transmitting time, the frames including the image data is transmitted at 115.2 kbps. Accordingly, since receiving these frames, the multifunction printer 60 can print the image data including the received frames. Subsequently, when the transmission continuity is selected at step S240, another image file is selected at the subsequent step S250. In addition, when the user inputs a printing instruction at step S110, another image file is printed by the one transmission. The reason is because the transmission condition of the cellular phone 10 is the same as the transmission condition (the communication rate of 115.2 kbps) on which the multifunction printer 60 can receive the image file. FIG. 8 is a sequence chart that illustrates communication sequences when a user initially inputs the transmission instruction of the image file, and then inputs a third transmission instruction to perform the printing process.

A correspondence relationship between the configuration constituents according to the embodiment and configuration constituents according to the invention will be described. The LED 34 and the IrDA controller 40 according to the embodiment correspond to a data transmitting unit according to the invention. In addition, the cursor key 20*a*, the transmission start button 20*d*, and the main controller 50 according to the embodiment correspond to a data selecting unit, an instruction inputting unit, and a control unit according to the invention, respectively. Moreover, the operation of the cellular phone 10 according to the embodiment corresponds to an example of a data transmitting method according to the invention.

According to the cellular phone 10 described above, the LED 34 and the IrDA controller 40 are controlled so that the image file is transmitted to the multifunction printer 60 by the one-way communication of the IrSimple protocol. At this time, the image file is selected by the user operation of the cursor key 20*a* on the basis of the transmission instruction that is input by pressing the transmitting start button 20*d*. Alternatively, when the same image file as an image file to be transmitted by the one-way communication of the IrSimple protocol is selected by the user operation of the cursor key 20*a*, and then instructions by which the image file is transmitted to the multifunction printer 60 by the user's pressing of the transmission start button 20*d* by the one-way communication of the IrSimple protocol are input successively 3 times within a predetermined time, the IrDA controller 40 and the LED 34 are controlled so that the transmission conditions of the image file are changed. That is, when the same image file is transmitted successively 3 times within the predetermined time by the one-way communication of the IrSimple protocol, the transmission by the one-way communication of the IrSimple protocol can fail. In addition, if the transmission fails, the transmission conditions of the image file may be a cause. Accordingly, after the transmission conditions of the image file are changed, the same image file is transmitted. By changing the transmission conditions, the image file can be transmitted successfully when the same image file is transmitted.

When the transmission is changed, at least one among the minimum packet interval, the data size, and the communication rate is changed. Since such transmission conditions are different from the transmission conditions on which the multifunction printer 60 can receive the image file, there is a high possibility of a data transmission error. As a result, an application of the invention is significant.

It is determined whether the image files to be transmitted by the transmission instruction successively input are identical or not identical on the basis of the OBEX parameters (the file name, the data size, the created data and time, etc) of the image files. Accordingly, since it is reliably determined whether the transmission instruction successively input is performed for the same image file, it is possible to carry out the more reliable data transmission.

Moreover, the invention is not limited to the above-describe embodiment, but may be implemented in various aspects as long as they are within the technical scope of the invention.

For example, according to the embodiment describe above, after the same image file starts to be transmitted and then the predetermined time lapses, it is possible to confirm the communication error. However, when the time limit is not set and the counter C reaches a predetermined number of times, a change in the transmission condition may be carried out. In this way, without the time limit, it can be determined only with the value of the counter C whether the transmission conditions are changed or not. Moreover, the time limit is not set and the counter C may be not set simultaneously. Then, when the transmission instructions of the same image file are successively input, the transmission condition can be changed.

In the embodiment described above, the predetermined number of the times is 2, but may be 1. In this way, when the transmission instruction of the same image file is input successively 2 times, the transmission condition can be changed.

In the embodiment described above, when the transmission conditions are changed, the transmission conditions of the one-way communication of the IrSimple protocol are changed. However, the transmission conditions may be changed into the two-way communication of the IrSimple protocol using the photo transistor 32 and the LED 34 or the two-way communication of the IrDA protocol using the photo transistor 32 and the LED 34. For example, the two-way communication may be used in "CHANGE IN FIRST TRANSMISSION CONDITION", and so on shown in Table 1. In this way, it is possible to obtain information about the transmission conditions on which the multifunction printer 60 is permissible. Accordingly, when the same data is transmitted at the next time, it is possible to raise the probability of transmission success. The data transmission can succeed more easily. In this case, the photo transistor 32 and the IrDA controller 40 correspond to a data receiving unit according to the invention.

In the embodiment described above, when it is determined whether the OBEX parameters are identical, it is determined whether all of the file name, the data size, and the created date and time are identical. However, it may be determined whether any one of these parameters is identical or it may be determined whether any two of these parameters are identical.

In the embodiment described above, when the conditions of a change in the transmission conditions is satisfied (when the transmission process of the one-way communication of the IrSimple protocol at step S270 is executed and the acknowledgment determination is made as shown in FIG. 5), the transmission conditions are changed. However, before the transmission conditions are changed, a message for asking a user whether the transmission conditions are changed can be displayed on display 24. Subsequently, only when the user operates the operation button 20 to input an instruction of the change in the transmission conditions, the transmission conditions may be changed. In this way, an intention of the user can be reflected. In this case, the operation button 20 and the display unit 23 correspond to a change/non-change inputting unit and an asking unit according to the invention, respectively.

In the embodiment describe above, when the conditions of the change in the transmission conditions is satisfied (when the transmission process of the one-way communication of the IrSimple protocol at step S270 is executed and the acknowledgment determination is made as shown in FIG. 5), the transmission conditions are changed. However, the display controller 25 may be controlled so that a message for notifying a user that a communication error can occur may be displayed on the display 24, instead. In this way, when there is a possibility that the data transmission error occurs in the one-way communication of the IrSimple protocol, the user can know that the data transmission error occurs. In addition, after notifying the user that the communication error can occur, the display controller 25 may be controlled so that a message for asking the user whether the user change the transmission conditions may be displayed on the display 24. At this time, only when the user operates the operation buttons 20 and inputs an instruction of changing the transmission conditions, the transmission conditions may be changed. Moreover, after notifying the user that the communication error can occur, an arbitrary selected transmission condition among the transmission conditions may be set by a user operation of the operation buttons 20. Accordingly, when the same image file is transmitted at the next time, the data transmission can succeed more easily. Furthermore, instead of controlling the display controller 25 to display the message on the display 24, or in addition to the display of the message on the display 24, a voice message may be spoken from a speaker 22 or a lamp (not shown) may turn off and on. In this case, the display 24 corresponds to a notification unit according to the invention.

In the embodiment described above, as the data transmitting apparatus, the cellular phone 10 is exemplified. However, a digital still camera, a video camera, a PC, etc. may be used as the data transmitting apparatus. In addition, as the data receiving apparatus, the multifunction printer 60 is exemplified. However, a television, an audio apparatus, a cellular phone other than the cellular phone 10, a PC, etc. may be used as the data receiving apparatus. Moreover, as the file to be transmitted by the one-way communication of the IrSimple protocol, the image file is exemplified. However, a file (music file, etc) other than the image file may be used.

In the embodiment described above, the one-way communication is described by using the infrared rays. However, the communication media is not limited to the infrared rays. For example, the one-way communication may be carried out by using radio waves or using a cable.

What is claimed is:

1. A data transmitting apparatus for transmitting data to a communication recipient by one-way communication, the data transmitting apparatus comprising:

a data transmitting unit transmitting data to the communication recipient by the one-way communication of a predetermined communication format;

a data selecting unit allowing a user to select the data to be transmitted by the one-way communication;

an instruction inputting unit allowing the user to input an instruction to transmit the data selected by the data selecting unit to the communication recipient by the one-way communication;

a control unit controlling the data transmitting unit to transmit the data selected by the data selecting unit to the communication recipient by the one-way communication on the basis of the instruction input through the instruction inputting unit; and a detecting unit detecting successive inputs that the instruction to transmit the same data to the communication recipient by the one-way communication is successively input by the instruction inputting unit, when the data selecting unit selects the same data, wherein the control unit controls the data transmitting unit to change the communication format of the one-way communication when the detecting unit detects the successive inputs.

2. The data transmitting apparatus according to claim 1, wherein the detecting unit detects the successive inputs that the instruction to transmit the same data to the communication recipient by the one-way communication is successively input by the instruction inputting unit within a predetermined time, when the data selecting unit selects the same data.

3. The data transmitting apparatus according to claim 1, wherein the detecting unit detects the successive inputs that the instruction to transmit the same data to the communication recipient by the one-way communication is successively input by the instruction inputting unit a predetermined number of times, when the data selecting unit selects the same data.

4. The data transmitting apparatus according to claim 1, further comprising:
 a change/non-change inputting unit allowing the user to input an instruction to change or not change the communication format; and
 an asking unit asking the user to input the instruction,
 wherein the control unit controls the asking unit to ask the user to input the instruction to change or not change the communication format when the detecting unit detects the successive inputs,
 wherein the control unit controls the data transmitting unit to change the communication format when the instruction to change the communication format is input through the change/non-change inputting unit, and
 wherein the control unit controls the transmitting unit not to change the communication format when the instruction not to change the communication format is input through the change/non-change inputting unit.

5. The data transmitting apparatus according to claim 1, wherein the communication format changed by the control unit is at least one of a transmission interval of a frame, a data size of the frame, a baud rate of the frame, and a communication rate of the frame when the data is transmitted in a plurality of frames.

6. The data transmitting apparatus according to claim 1, further comprising a data receiving unit receiving data from the communication recipient,
 wherein the control unit controls the data transmitting unit and the data receiving unit to change the one-way communication to two-way communication that enables the data transmitting unit and the data receiving unit to communicate with each other when the detecting unit detects the successive inputs.

7. A data transmitting apparatus for transmitting data to a communication recipient by one-way communication, the data transmitting apparatus comprising:
 a data transmitting unit transmitting data to the communication recipient by the one-way communication;
 a data selecting unit allowing a user to select the data to be transmitted by the one-way communication;
 an instruction inputting unit allowing the user to input an instruction to transmit the data selected by the data selecting unit to the communication recipient by the one-way communication;
 a control unit controlling the data transmitting unit to transmit the data selected by the data selecting unit to the communication recipient by the one-way communication on the basis of the instruction input through the instruction inputting unit;
 a detecting unit detecting successive inputs that the instruction to transmit the same data to the communication recipient by the one-way communication is successively input by the instruction inputting unit, when the data selecting unit selects the same data; and
 a notification unit notifying information to the user,
 wherein the notification unit notifies a possibility of a transmission error to the user when the detecting unit detects the successive inputs.

8. A method of transmitting data to a communication recipient by one-way communication, the method comprising:
 (a) transmitting the data to the communication recipient by the one-way communication on the basis of an instruction to transmit the data selected as data to be transmitted by the one-way communication by a user to the communication recipient by the one-way communication; and
 (b) changing a communication format of the data when the same data is selected as the data to be transmitted by the one-way communication and the instruction to transmit the data to the communication recipient by the one-way communication is successively input.

* * * * *